(12) United States Patent
Kappertz et al.

(10) Patent No.: US 7,823,461 B2
(45) Date of Patent: Nov. 2, 2010

(54) MAGNETICALLY INDUCTIVE CROSS-FLOW SENSOR AND METHOD FOR THE PRODUCTION THEREOF

(75) Inventors: Fred Kappertz, Hochwald (CH); Frank Voigt, Lörrach (DE); Daniel Wild, Birsfelden (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/582,630

(22) PCT Filed: Dec. 2, 2004

(86) PCT No.: PCT/EP2004/053236

§ 371 (c)(1),
(2), (4) Date: Feb. 26, 2007

(87) PCT Pub. No.: WO2005/057140

PCT Pub. Date: Jun. 23, 2005

(65) Prior Publication Data

US 2008/0053241 A1 Mar. 6, 2008

(30) Foreign Application Priority Data

Dec. 11, 2003 (DE) .................................. 103 58 268
Feb. 9, 2004 (DE) ......................... 10 2004 006 382

(51) Int. Cl.
*G01F 1/58* (2006.01)

(52) U.S. Cl. .................................. 73/861.12; 73/861.11

(58) Field of Classification Search .. 73/861.11–861.12
See application file for complete search history.

(56) References Cited

U.S. PATENT DOCUMENTS

| | | | | |
|---|---|---|---|---|
| 4,388,834 A * | 6/1983 | Schmoock | ................ | 73/861.12 |
| 5,773,723 A * | 6/1998 | Lewis et al. | .............. | 73/861.12 |
| 7,178,407 B2 * | 2/2007 | Kappertz et al. | .......... | 73/861.11 |
| 2002/0033054 A1 * | 3/2002 | Frey et al. | ................. | 73/861.12 |
| 2003/0213119 A1 * | 11/2003 | Frey et al. | ...................... | 29/606 |
| 2006/0096391 A1 * | 5/2006 | Kappertz et al. | ....... | 73/861.357 |

FOREIGN PATENT DOCUMENTS

DE        3201562 A1    8/1983

(Continued)

*Primary Examiner*—Lisa M Caputo
*Assistant Examiner*—Jonathan Dunlap
(74) *Attorney, Agent, or Firm*—Bacon & Thomas, PLLC

(57) ABSTRACT

A flow sensor includes: A measuring tube for the conveying of an electrically conductive fluid; a magnetic circuit arrangement arranged on the measuring tube for producing and guiding a magnetic field, which induces an electric field in the flowing fluid; and measuring electrodes for the tapping of a voltage of the electric field. The measuring tube includes a carrier tube and liner, especially a tubular liner, of insulating material, accommodated in a lumen of the carrier tube. A support skeleton may serve for stabilization is embedded in the liner. The carrier tube additionally has at least a first groove formed in a wall of the carrier tube and open towards the lumen of the carrier tube, whereby, on the one hand, the tendency of the liner and/or of the possibly present support skeleton towards crack formation upon temperature changes, especially in the case of cooling, can be considerably reduced, and, on the other hand, a rotation or displacement of the support skeleton in the carrier tube, especially in the case of possible material shrinkage, can be effectively prevented.

7 Claims, 5 Drawing Sheets

FOREIGN PATENT DOCUMENTS

| | | |
|---|---|---|
| DE | 100 64 845 A1 | 7/2002 |
| EP | 10 039 269 A1 | 9/2000 |
| JP | 57088321 A | 6/1982 |
| JP | 58053718 A | 3/1983 |
| JP | 62035224 A | 2/1987 |
| JP | 03276023 A | 12/1991 |
| JP | 2002048612 A | 2/2002 |

* cited by examiner

MAGNETICALLY INDUCTIVE CROSS-FLOW SENSOR AND METHOD FOR THE PRODUCTION THEREOF

FIELD OF THE INVENTION

The invention relates to a method for manufacturing a magneto-inductive flow sensor, or pickup, and to a flow sensor correspondingly manufacturable by means of the method.

BACKGROUND DISCUSSION

As is known, magneto-inductive flow sensors enable measurement of the volume flow, e.g. volume flow rate, of an electrically conductive fluid flowing in a stream direction through a flow sensor measuring tube. For this, a magnetic field of highest possible density is produced at the flow sensor by means of a magnetic circuit arrangement coupled to an exciter electronics. The magnetic field passes through the fluid within a measuring volume at least sectionally perpendicularly to the flow direction. The magnetic field closes on itself essentially outside of the fluid. The measuring tube therefore is usually made of a non-ferromagnetic material, in order that the magnetic field is not unfavorably influenced during measuring.

As a result of the movement of free charge carriers of the fluid in the magnetic field according to the magneto-hydrodynamic principle, there is produced in the measuring volume an electric field, which is directed perpendicular to the magnetic field and perpendicular to the flow direction of the fluid. By means of at least two measuring electrodes arranged spaced from one another in the direction of the electric field, and by means of an evaluation electronics connected to these electrodes, an electric voltage induced in the fluid is measurable. This voltage is a measure for the volume flow rate. The flow sensor is so constructed, that the induced electric field closes outside of the fluid essentially exclusively by way of the evaluation electronics connected to the measuring electrodes.

Measuring electrodes, for example, galvanic, fluid-contacting, or capacitive, fluid-non-contacting, measuring electrodes, can serve for tapping the induced voltage.

For guiding the magnetic field and for in-coupling of the magnetic field into the measuring volume, the magnetic circuit arrangement usually includes two coil cores, which are arranged spaced from one another, especially diametrally spaced, on the periphery of the measuring tube. Each core includes a free end face and these faces are located especially as mirror images of one another. The magnetic field is so coupled into the coil cores by means of a coil arrangement connected to the exciter electronics, that it passes through the fluid in the measuring tube at least sectionally perpendicularly to the flow direction of the fluid.

Due to the required, high mechanical stability of such measuring tubes, they are made preferably of an outer, especially metal, carrier tube of predeterminable strength and diameter, and the carrier tube is coated internally with an electrically non-conductive, insulating material of predeterminable thickness, the so-called liner. Thus, in U.S. Pat. No. 6,595,069, U.S. Pat. No. 5,280,727, U.S. Pat. No. 4,253,340, U.S. Pat. No. 3,213,685 or JP-Y53-51 181, a magneto-inductive flow sensor is described, which includes:

a measuring tube, which is insertable pressure-tightly into a pipeline and has a first, inlet end and a second, outlet end, having a non-ferromagnetic carrier tube as an outer encasement of the measuring tube, and a tubular liner accommodated in a lumen of the carrier tube, the liner being of an insulating material and serving to convey a flowing fluid insulated from the carrier tube, a magnetic circuit arrangement arranged on the measuring tube for producing and guiding a magnetic field, which induces an electric field in the flowing fluid, as well as a first measuring electrode and a second measuring electrode for the tapping of a voltage of the electric field.

The liner serves for the chemical isolation of the carrier tube from the fluid. In the case of carrier tubes of high electric conductivity, especially in the case of metal carrier tubes, the liner serves, moreover, as an electrical insulation between the carrier tube and the fluid, which prevents a short circuiting of the electric field through the carrier tube. By a corresponding design of the carrier tube, therefore, a matching of the strength of the measuring tube to the mechanical loads present in the particular application is implementable, while, by means of the liner, a suiting of the measuring tube to the chemical, especially hygienic, requirements present for the particular application can be realized. For manufacturing the liner, often injection molding or transfer molding methods are used. It is, however, also usual to insert into the carrier tube a completely prefabricated liner. Thus, in JP-A 59-137 822, a method is disclosed, in which the liner is formed from softened plastic foil.

In the liner, made most often of a thermoplastic, or thermosetting, plastic, usually open-pored support skeletons are embedded to give it stability; compare, for example, also EP-A 36 513, EP-A 581 017, JP-Y 53-51 181, JP-A 59-137 822, U.S. Pat. No. 6,595,069, U.S. Pat. No. 5,664,315, U.S. Pat. No. 5,280,727 or U.S. Pat. No. 4,329,879. These serve to stabilize the liner mechanically, especially relative to pressure changes and thermally related, volume changes. For example, in U.S. Pat. No. 5,664,315, a method is described for manufacturing a measuring tube of a magneto-inductive flow sensor, which is provided internally with a liner, wherein, before the installing of the liner into the carrier tube, an expanded metal lattice in the form of a prefabricated support skeleton is put in place for mechanically stabilizing the liner. Additionally, in JP-Y 53-51 181, a tubular support skeleton is disclosed, in whose lateral surfaces bores are formed, while in EP-A 581 017 or U.S. Pat. No. 6,595,069, sintered support skeletons are shown. The support skeletons are placed in the measuring tube in alignment therewith and are completely encased by the insulating material, at least on the inner side contacting the fluid Further, in U.S. Pat. No. 6,595,069, a method for manufacturing a liner with embedded support skeleton is disclosed, wherein support skeleton and liner are manufactured directly in the lumen of the carrier tube, with the support skeleton being first formed by sintering within the carrier tube and the liner being subsequently formed by solidification of liquid insulating material charged into the carrier tube.

By the sintering of the support skeleton directly in the carrier tube, such can be matched in an almost completely flexible manner in its form and size to the requirements set by the application or also by the manufacturing process. For example, it has also been disclosed in U.S. Pat. No. 6,595,069, that the support skeleton is formed in each case with the ends broadening such that it fits in correspondingly end-located, funnel-shaped widenings in the carrier tube, and is, in this way, axially fixed in place. Beyond this, a support skeleton is shown in U.S. Pat. No. 6,595,069, which completely or partially fills lateral openings provided centrally in the carrier tube, so that an additional locking of the support skeleton in the carrier tube is achieved.

It has been shown, it is true, on the one hand, that liners of the described kind exhibit a very high mechanical durability, even in temperature ranges of −40° C. up to 200° C. On the other hand, however, this high durability is associated very closely with an extremely high quality, especially also of the support skeleton.

Investigations have, however, shown, that, as a result of the, at times arising, high temperatures of up to 1000 K (Kelvin), especially during the sintering of the support skeleton and during casting of the liner, and, because of the usually mutually differing cooling behavior of carrier tube and support skeleton, resulting from their mutually differing thermal, material properties and forms, high mechanical stresses can arise in the support skeleton, stresses which, under the right circumstances, can lead to crack formation and thus to a reduction of the quality of the support skeleton, or, correspondingly, even to the destruction of the liner. Additionally, it has been determined, that the almost unavoidable shrinkage of the sinter material following the sinter process can lead to a considerable play between support skeleton and carrier tube. Additionally, it was determined that such a play, for example in the case of the support skeleton disclosed in U.S. Pat. No. 6,595,069, can lead to a no longer negligible or tolerable shifting of the same in the carrier tube, so that additional measures must be used for centering and locking the support skeleton in the carrier tube.

SUMMARY OF THE INVENTION

An object of the invention is, therefore, to provide a magneto-inductive flow sensor, as well as a method suited for manufacture of such a flow sensor, in the case of which flow sensor, on the one hand, the tendency of the liner and/or of the possibly present support skeleton toward crack formation in the face of temperature changes, especially in the case of cooling, is significantly lessened and, on the other hand, a twisting or shifting of the support skeleton in the carrier tube, even in the case of possible material shrinkage, can be effectively prevented.

For achieving the object, the invention resides in a magneto-inductive flow sensor for a fluid flowing in a pipeline, including: A measuring tube for conveying the fluid; a magnetic circuit arrangement arranged at the measuring tube for producing and guiding a magnetic field, which induces an electric field in the flowing fluid; and measuring electrodes for tapping a voltage of the electric field. The measuring tube includes a carrier tube and a liner, especially a tubular liner of insulating material accommodated in a lumen of the carrier tube. The carrier tube further includes at least a first groove formed in a wall of the carrier tube and open towards the lumen of the carrier tube.

Additionally, the invention resides in a method for manufacturing the measuring tube for the above-defined flow sensor of the invention, which method includes the steps of: Producing the support skeleton in the lumen of the carrier tube and installing the liner into the lumen of the carrier tube. For producing the support skeleton, loose sinter ingredients are charged into the lumen of the carrier tube in such a manner that they at least partially fill the at least one groove, and the charged sinter ingredients are sintered within the carrier tube. Once the sinter ingredients have been sintered within the carrier tube, for installing the liner in the lumen, insulating material is allowed to penetrate at least partially into the produced support skeleton and to solidify in the lumen of the carrier tube.

In a first further development of the flow sensor of the invention, the measuring tube has, for the stabilizing of the liner, additionally an open-pored support skeleton embedded in the liner, and the at least one, especially backcut, e.g. dovetailed, groove is, at least partially, so filled by an, especially sintered, material of the support skeleton, especially a support skeleton sintered directly in the carrier tube, that the support skeleton is connected with the carrier tube by shape-interlocking.

In a second further development of the flow sensor of the invention, the carrier tube further includes at least a second groove formed in the wall of the carrier tube and open towards the lumen of the carrier tube.

In a first embodiment of the flow sensor of the invention, the at least one, especially backcut, groove is, at least partially, so filled by insulating material of the liner, that the liner is connected with the carrier tube by shape-interlocking.

In a second embodiment of the flow sensor of the invention, the at least one groove has a backcut, which is so filled by insulating material of the liner, that, between liner and carrier tube, a shape-interlocking is formed, which acts at least radially inwardly.

In a third embodiment of the flow sensor of the invention, the groove is developed as an annular groove running essentially coaxially with the wall of the carrier tube.

In a fourth embodiment of the flow sensor of the invention, the groove has an essentially trapezoidally shaped cross section.

In a fifth embodiment of the flow sensor of the invention, the carrier tube comprises a non-ferromagnetic material, especially a stainless steel.

In a sixth embodiment of the flow sensor of the invention, the support skeleton comprises a sintered metal, a sintered ceramic and/or a sintered glass.

In a seventh embodiment of the flow sensor of the invention, the liner comprises a plastic, especially a thermoplastic, or a thermosetting, plastic.

In an embodiment of the first further development of the invention, the at least one groove has a cutback, which is so filled by material of the support skeleton, that, between the support skeleton and the carrier tube, a radially inwardly acting, shape-interlocking is formed.

In a further embodiment of the first further development of the invention, there is formed on the support skeleton a ridge corresponding with the first groove, comprised at least partially of the material of the support skeleton and protruding into the first groove.

In a first embodiment of the method of the invention for producing the support body, the sinter ingredients are filled into a sinter space formed in the lumen of the carrier tube by means of at least one sinter-core inserted therein.

In a second embodiment of the method of the invention, for installing the liner, the insulating material is liquified and cast into a casting space formed in the lumen of the carrier tube by means of at least one casting core inserted therein.

A basic idea of the invention is, on the one hand, to use an additional, especially radially inwardly and axially acting, shape-locking of the liner and/or the support skeleton with the carrier tube to minimize maximum bending moments, or bending stresses, arising in the support skeleton and/or in the liner, and, so, to hold, to a very low level, the tendency for crack formation in the support skeleton and/or liner. On the other hand, it is possible, by a shape-locking connecting of the support skeleton with the carrier tube, also to effectively prevent a twisting or tilting of the support skeleton in the carrier tube, especially before, or during, production of the liner.

BRIEF DESCRIPTION OF THE DRAWINGS

The invention will now be explained in greater detail on the basis of examples of embodiments presented in the drawing. Equal parts are provided with equal reference characters. However, in case required for overviewability, reference characters are omitted in subsequent figures. The figures of the drawing show as follows.

DETAILED DESCRIPTION OF THE DRAWINGS

Figure 1:
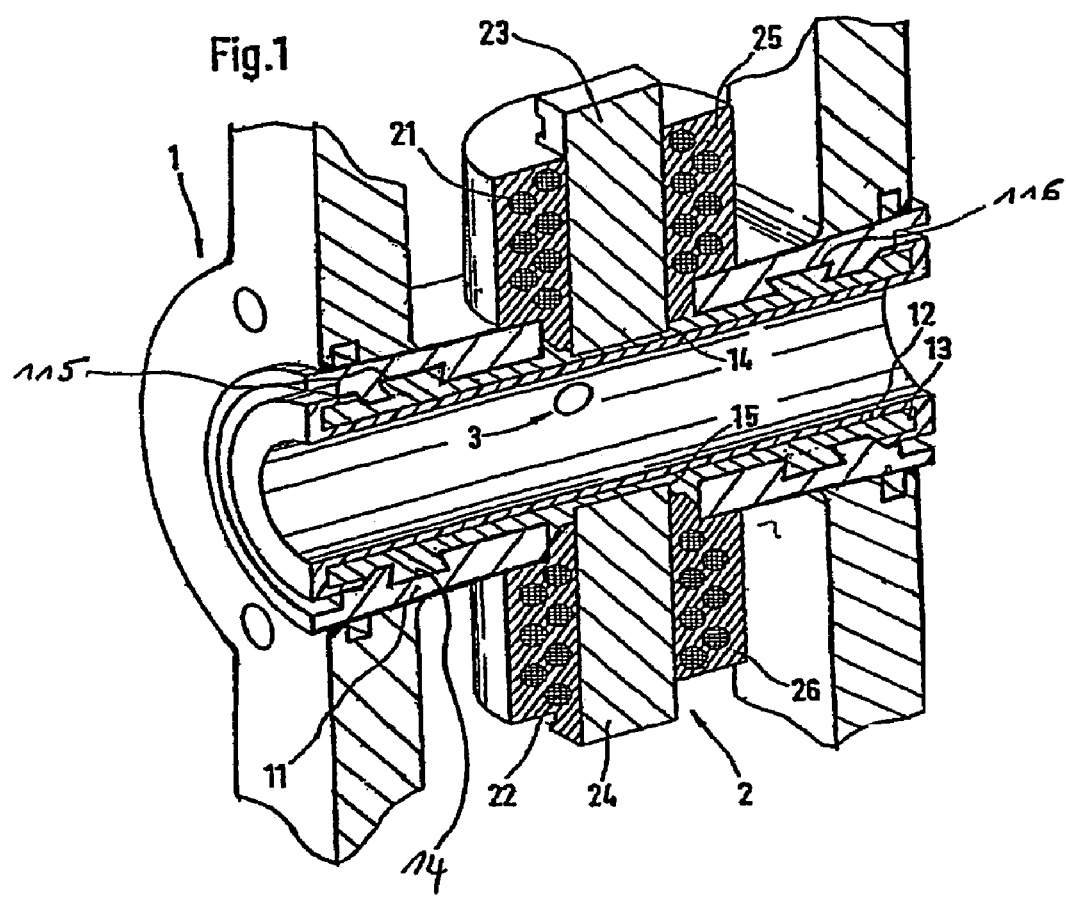
FIG. 1 perspectively, in longitudinal section, a magneto-inductive flow sensor.
Figure 2:
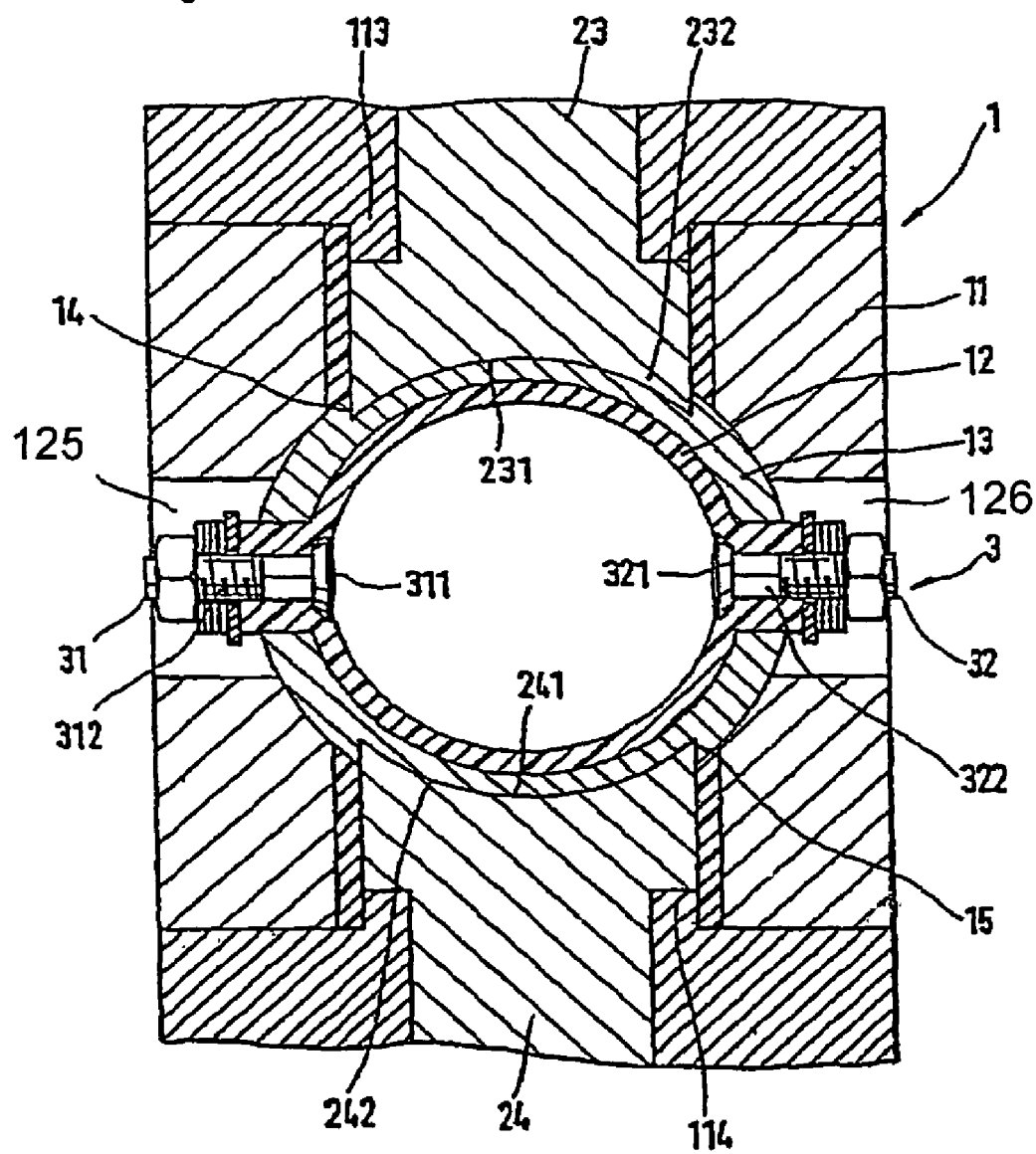
FIG. 2 in cross section, an essential part of a magneto-inductive flow sensor.

FIG. 1 shows perspectively in longitudinal section, a magneto-inductive flow sensor, and FIG. 2 shows schematically in cross section an essential part of the flow sensor. The flow sensor includes: A straight measuring tube 1 of predetermined form and size for conveying a flowing fluid; a magnetic circuit arrangement 2 located at the measuring tube 1 for directing a magnetic field through the fluid; as well as a measuring electrodes arrangement 3 located on the measuring tube 1 for measuring a voltage induced in the fluid.

For pressure-tight joining into a pipeline through which a fluid can flow, the measuring tube 1 includes on a first end toward the inlet side a first flange and on a second end toward the outlet side a second flange.

The measuring tube 1 includes: A carrier tube 11 of predeterminable lumen; a tubular liner 12 made of an insulating material and having a predeterminable diameter; and an open-pored support skeleton 13 embedded in the liner 12 and having predeterminable pore size and thickness. The likewise tubularly embodied, support skeleton 13 serves for the mechanical stabilizing of the liner 12, especially at temperatures of the flowing fluid of 40° C. to 200° C., in a pressure range of 0 bar to 40 bar.

The carrier tube 11 encloses the liner 12 with embedded support skeleton 13 coaxially and serves, therefore, as an outer, form-giving, as well as form-stabilizing, encasement of the measuring tube. As shown in FIGS. 1 and 2, the measuring tube 1 is so embodied that the support skeleton 13 is covered on its fluid-facing, inner side completely by liner 12 and, consequently, only the liner 12 is wetted by fluid flowing through the measuring tube 1; compare, in this connection, also U.S. Pat. No. 3,213,685. As required, the carrier tube 11 itself can also be contacted internally by material of the liner. Especially, the carrier tube 11 can itself be completely coated internally by the material of the liner.

For producing and guiding the magnetic field to pass sectionally through the fluid, the flow sensor of FIGS. 1 and 2 includes a magnetic circuit arrangement 2. This includes first and second cylindrical coils 21, 22, each of which surrounds, respectively, a first and a second ferromagnetic coil core 23, 24 having, in each case, free, terminal, first and, respectively, second, end faces 232, 242 of predeterminable form. For suppressing eddy currents, the coil cores are preferably embodied in the form of a single formed sheet or as a packet of a plurality of layered, formed sheets electrically insulated from one another; compare JP-Y 2-28 406 or U.S. Pat. No. 4,641,537. Outside of the measuring tube 1, the coil cores 23, 24 are connected on their ends lying opposite to their respective end faces 232, 242, with a likewise ferromagnetic back-closure (not shown) of predeterminable length and form. Usually, the back-closure is directed externally around both sides of the measuring tube 1; compare, in this connection, U.S. Pat. No. 4,641,537.

The coils 21, 22 are wound on respective tubular first and second coil bodies 25, 26 coaxially surrounding the respective coil cores 23, 24; the coils 21, 22 can, however, also be self-supporting or at least partially embedded in the coil bodies 25, 26. Besides magnetic circuit arrangements having two coils, also such with three or more coils are usual; compare, in this connection, JP-A 3 218 414. During measurement operation, the coils 21, 22 are connected with an exciter electronics for producing electrical current of predeterminable current strength and are flowed through by such current. In this way, two magnetic field components are produced, which cut through the respective end faces 232, 242 of the associated coil cores 23, 24 essentially normally thereto and, in such case, superimpose so as to form a directed, resultant magnetic field. This passes through the fluid flowing within the measured volume sectionally perpendicularly to its flow direction. Used as exciter electronics can be circuit arrangements described in the state of the art.

For accommodating the coil cores 23, 24, the measuring tube 1 includes a first coil core seat 14 for the endwise insertion of the coil core 23 and a second coil core seat 15 for the endwise insertion of the coil core 24; compare FIGS. 1 and 2. The coil core seats 14, 15 include respective first and second surfaces for the shape-matching contacting of the respective end faces 231, 241 of the coil cores 23, 24, and the respective coil cores 23, 24 lie flushly against these surfaces.

For the seating of the coil cores 23, 24 into the coil core seats 14, 15, the carrier tube 11 is provided with a first lateral opening 113 and with a second lateral opening 114. Both lateral openings 113, 114 have the same form and are arranged spaced from one another on a circumferential circle of the carrier tube 11, especially so that they lie diametrally opposite one another. The coil cores 23, 24 are so inserted through the respective laterals openings 113, 114 into the measuring tube 1 and so oriented with respect to one another that their two end faces 231, 241 are spaced from one another along a circumferential circle, especially such that they lie diametrally spaced, in effect as mirror images, opposite one another. The lateral openings 113, 114, respectively the end faces 231, 241 can, however, also be arranged spaced from one another and/or not as mirror images, along a secant or chord of the circumferential circle of the measuring tube 1; compare JP-A 3-218 414. For the seating of the coil cores 23, 24, the lateral openings 113, 114 are of course to be so dimensioned that the coil cores 23, 24 fit through.

For sensing a voltage induced in the fluid, the flow sensor of FIGS. 1 and 2 includes a sensor arrangement 3 mounted on the measuring tube 1. The sensor arrangement includes first and second measuring electrodes 31, 32. The measuring electrodes are rod-shaped, with first and second measuring electrode heads 311, 321 for the sensing of the aforementioned, induced voltage and with first and second measuring electrode shafts 312, 322, which serve for the connecting of the sensor arrangement to an evaluation electronics. The measuring electrodes 31, 32 can, as shown in FIG. 2, be galvanic measuring electrodes; they can, however, also be capacitive measuring electrodes. The carrier tube 11 is therefore additionally provided with third and fourth lateral openings 125, 126 for the seating of the measuring electrodes 31 and 32, respectively. The lateral surface openings 125, 126 have a width, which is greater than a greatest diameter of the respective measuring electrode shafts 312, 322. They have preferably the same form and lie preferably diametrally opposite one another, with a diameter of the carrier tube 11 connecting the lateral openings 125, 126 being perpendicular to a diameter of the carrier tube 11 connecting the lateral openings 113, 114. Of course, the measuring electrodes 31, 32 can, in case required, especially in the case of more than two measuring electrodes, be so arranged spaced from one another on the measuring tube 1, that they do not lie diametrally opposite one another. This is e.g. the case, when additional measuring electrodes are provided for reference potentials or in the case of horizontal installed orientation of the measuring tube 1, measuring electrodes for monitoring a minimum fill level of the fluid in the measuring tube 1.

According to the invention, the carrier tube additionally includes at least a first groove 115 formed in a wall of the carrier tube and open to the lumen of the carrier tube 11, wherein the groove 115 is at least partially filled by the insulating, or isolating, material of the liner 13 and/or by material of the support skeleton 12.

In a further development of the flow sensor of the invention, the carrier tube 11 includes at least a second groove 116 open to the lumen of the carrier tube and formed in the wall of the carrier tube 11 spaced from the first groove 115. Both grooves 115, 116 can advantageously be formed essentially equally to one another. In case required, of course, further grooves serving for stabilizing the liner 12 or the support skeleton 13 can be provided in the carrier tube 11.

In an embodiment of the invention, the at least one groove 115 can be at least partially so filled by material of the support skeleton 12, that the support skeleton 12 is connected with the carrier tube 11 on the basis of shape interlocking, with ridge 14 being formed on the support skeleton 12 in correspondence with the groove 115, made at least partially of the material of the support skeleton and protruding into the groove.

In a further embodiment of the invention, the at least one groove 115 is at least partially so filled with insulating material of the liner 13, that the liner 13 is connected with the carrier tube by means of shape-interlocking.

In another embodiment of the invention, the at least one groove is at least partially filled both by insulating material of the liner 13 and also by material of the support skeleton 13, with the ridge 14 being at least partially of the insulating material of the liner 13 and also the material of the support skeleton 12.

Preferably, the first groove 115 has, as shown in FIG. 1, a backcut, e.g. a dovetailed cross section. The backcut is so filled by insulating material of the liner 13, that, between liner 13 and carrier tube 11, a shape-interlocking is formed acting radially inwardly, thus in the direction of the lumen, especially, however, a radially and axially shape-interlocking acting radially and axially with respect to a longitudinal axis of the measuring tube 1 and/or the backcut is so filled by material of the support skeleton 12, that, between support skeleton 12 and carrier tube 11, a shape-interlocking is formed acting radially inwardly, especially, however, a radially and axially effective, shape-interlocking with respect to the longitudinal axis of the measuring tube 1.

In a further embodiment of the invention, the groove 115 is embodied as an annular groove running essentially coaxially with respect to the wall of the carrier tube 11, especially an annular groove having an essentially trapezoidally, or dovetail, shaped cross section. The annular groove is at least sectionally filled by the ridge 14 formed on the support skeleton 12 and/or the liner 13.

FIGS. 3a to 3f show various process steps of the method of the invention for manufacturing the flow sensor.

Figure 3A:
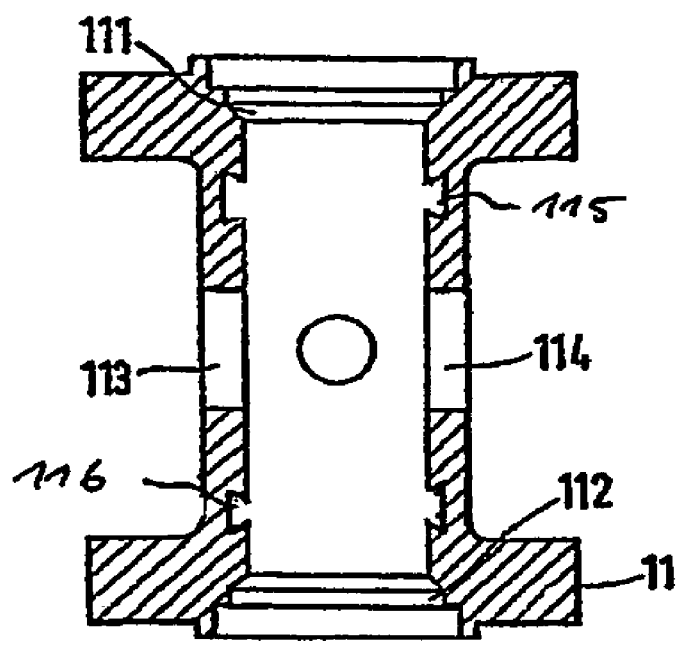
FIG. 3*a* in longitudinal section, a carrier tube with openings in the lateral surface for insertion of coil cores and measuring electrodes.

In FIG. 3a, carrier tube 11 is shown at the beginning of the method and has two grooves 115, 116 in its wall. Carrier tube 11 is preferably manufactured cost-favorably as a cast part, which subsequently is made ready by machining methods such as milling, turning and/or drilling; it can, of course, also be fabricated exclusively by machining methods or other manufacturing methods known to those skilled in the art for tubes. The carrier tube 11 can be made of all materials usual for flow sensors, such as stainless steels, especially alloyed and highly alloyed stainless steels; it is possible, however, to use other non-ferromagnetic alloys, such as e.g. copper alloys, titanium alloys or nickel alloys, but also suitable plastic materials, such as e.g. glass-fiber reinforced plastics.

The support skeleton 13 is, per FIG. 1, a tubular body, which, in the method of the invention, is fabricated by in-situ sintering of granular sinter starting material of predetermined particle size, thus by sintering in the final installed shape and position, in the carrier tube 11 fittingly and locked in place.

Figure 3B:
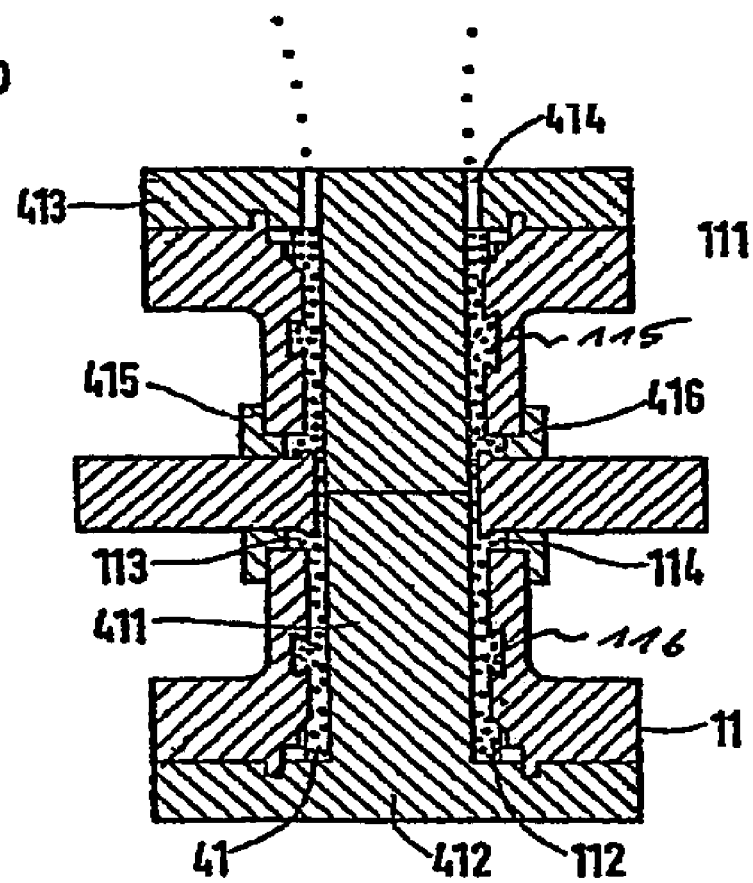
FIG. 3*b* in longitudinal section, the charging of sinter material into the carrier tube of FIG. 3*a*.

In FIG. 3b, for the sintering of the support skeleton 13, a first sinter core 411 is introduced into the lumen of the carrier tube 11 and fixed there temporarily in such a manner that a first sinter space 41 is formed there, extending coaxially with the carrier tube 11 and having a predeterminable first sinter volume. Sintering core 411 is composed of two core portions, which are so embodied that, following insertion into the support table 11, they abut one another with their respective end faces; the sintering core 411 can, of course, also the embodied in one piece in suitable manner.

Sintering core 411 is preferably rotationally symmetric with reference to a longitudinal axis and has a smallest diameter, which is greater then the predetermined diameter of the liner 12, and a greatest diameter, which is smaller than a greatest inner diameter of the carrier tube 11; sintering core 411 can, of course, also, when required, be embodied non-rotationally-symmetrically, e.g. elliptically or prismatically.

In case the support skeleton 13 is, as e.g. usual in the case of small nominal diameters of 10 mm to 20 mm, in each case conically tapered, or tapered in the manner of a funnel, in each case from the inlet and outlet ends inwards to the measuring tube, then the sintering core 411 is made of two core portions, which are embodied, in corresponding manner, conically or in the manner of a funnel and which, following insertion into the carrier tube 11, about on one another, in each case, with their smaller end faces.

Following insertion of the sintering core 411, the carrier tube 11 is so closed, that only charging openings for the sinter starting material remain. These are, in such case, preferably formed by a single left-open end of the carrier tube 11. The fixing of the sintering core 411 and the closing of the sinter space 41 occurs usually by means of a terminal first flange 412; if the sinter core 411 is, as shown in FIG. 3b, also fixed at the second end by means of a terminal second flange 413, then preferably one of the two flanges 412, 413 includes the appropriate charging opening 414. It is a matter of course and clear, that particle size, sinter volume and charging openings are such that the sinter starting material is fillable into the sinter space 41.

After closing the sinter space 41, this is, as indicated schematically in FIG. 3b, filled with sinter starting material, and, indeed, in such a manner, that also the grooves 115, 116, formed in the carrier tube 11 are at least partially filled. Subsequently, the sinter starting, material is sintered in the sinter space 41, whereby the support skeleton 13 is formed to fit in the lumen of the carrier tube 11, along with at least partially, also the ridge 14; compare FIG. 3c. As required, the carrier tube 11 is completely tightly sealed before the sintering.

Serving as sinter starting material is metal particles, especially metal particles of sinter bronze; however, also other materials can be used, such as e.g. sinter glass particles, sinter ceramic particles, or sinterable plastic particles, especially plastic particles having metallized surfaces.

Per FIGS. 1 and 2, measuring tube 1 is coated internally with a liner 12, and, indeed, in such a manner that the support skeleton and carrier tube are, during operation of the flow sensor, completely insulated from the fluid flowing through.

Figure 3C:
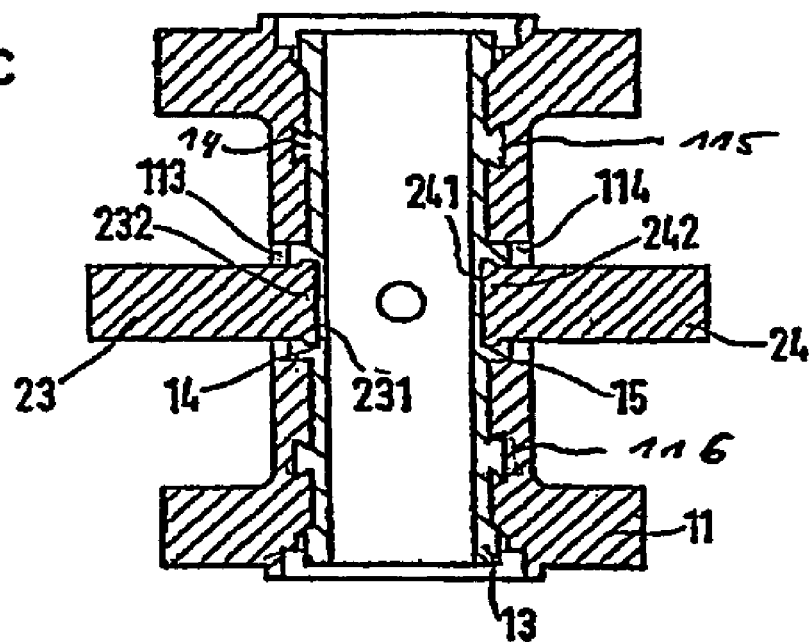
FIG. 3*c* in longitudinal section, the carrier tube of FIG. 3*a*, with a support skeleton and with coil cores sintered therein.
Figure 3D:
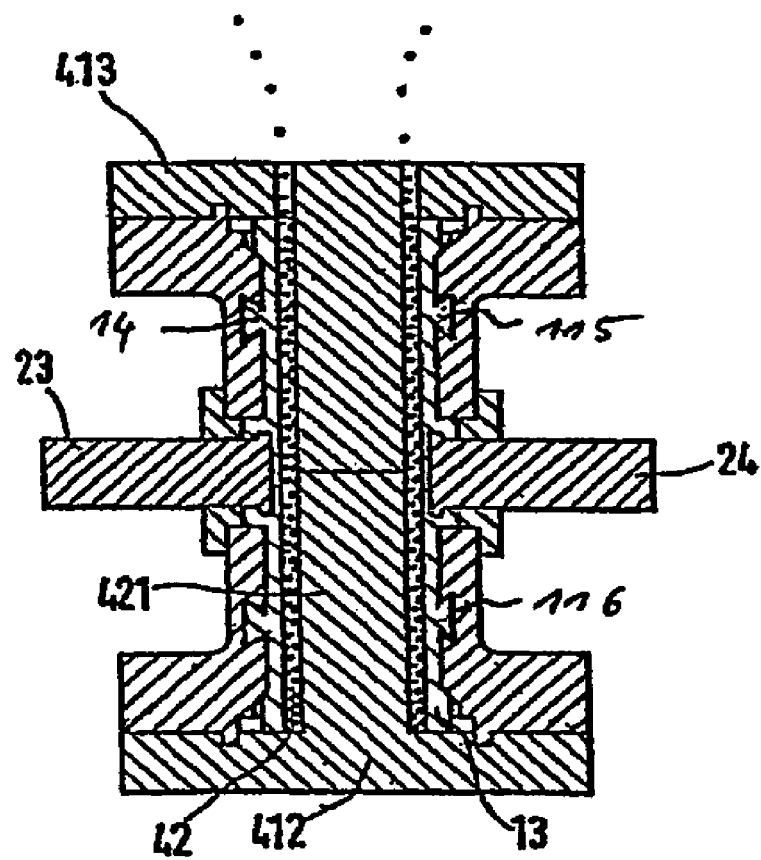
FIG. 3*d* in longitudinal section, the charging of further sinter material into the carrier tube of FIG. 3*c*.
Figure 3E:
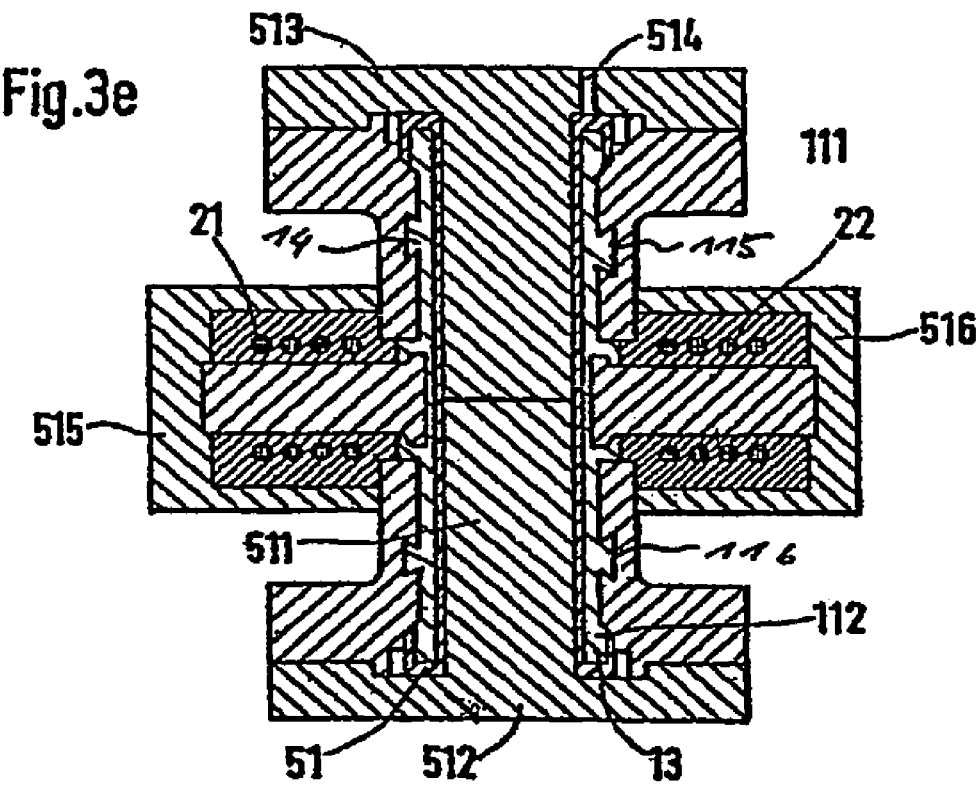
FIG. 3*e* in longitudinal section, the charging of insulating material into the carrier tube of FIG. 3*c*.

The liner is, per FIG. 3e, produced likewise directly in the carrier tube 11 following manufacture of the support skeleton 13 by the charging of liquid insulating material thereinto and subsequent solidification thereof. This occurs preferably in a usual transfer-compression or injection molding method.

The insulating material can be any of those plastics usually used for the liner 12 in flow sensors, provided that the plastic can be liquified at least once for the charging into the carrier tube. Examples are thermoplastics, especially fluorine containing thermoplastics, or polyolefins, or thermosetting plastics, especially castable resins or polyurethanes.

For manufacturing the liner 12, the sintering core 411, respectively 421, is replaced by a casting core 511, which is temporarily so fixed in the lumen of the carrier tube 11, that, between the casting core 511 and the support skeleton 13 a casting space 51 is formed aligned coaxially with the longitudinal axis of the lumen. Casting space 51 is of predeterminable casting volume. The casting core 511 is preferably cylindrically formed, with a diameter, which, considering a casting volume shrinkage following solidification, is, at most, equal to the predetermined diameter of the liner 12.

After introduction of the first casting core 511, the carrier tube 11 is so sealed tightly for casting that only pouring openings for the liquified insulating material remain. The fixing of the casting core 511 and the sealing of the carrier tube 11 occurs usually by means of third and fourth, terminal flanges 512, 513, of which e.g. one contains an appropriate pouring opening 514.

Following sealing of the carrier tube 11, liquid insulating material is filled into the casting space 51. This penetrates into the pores of the support skeleton 13 and fills them; as required, also, in this way, the sintered ridge 14 is completed with insulating material.

The pouring is maintained preferably for a sufficient time that the casting space 51 and support skeleton are filled completely with the insulating material, at least, however, for a sufficient time that the casting space 51 is completely filled with the insulating material and the support skeleton 13 is at least partially filled. In this way, the insulating material, following solidification, covers the support skeleton 13 completely, at least on the inner side facing toward the fluid during operation of the flow sensor.

Following pouring, the insulating material is allowed to solidify and thus the liner 12 with embedded support skeleton 13 is formed in the lumen of the carrier tube 11 in an exactly fitting manner such that it insulates the support skeleton 13 and the carrier tube 11 from the fluid.

Carrier tube 11 has, in a further development of the invention, a first widening 111 formed terminally into the inlet-side first end and a second widening 112 formed into the outlet-side, second end. The two widenings 111, 112 are, in FIG. 1, respectively 3a, sectionally inwardly, conically tapered; they can, however, also be cylindrically straight in form.

The two widenings 111, 112 are at least partially filled with sinter material during sintering, and, indeed, such that the sintered support skeleton 13 is engaged with the carrier tube and is, consequently, additionally affixed; compare FIG. 3c.

Figure 3F:
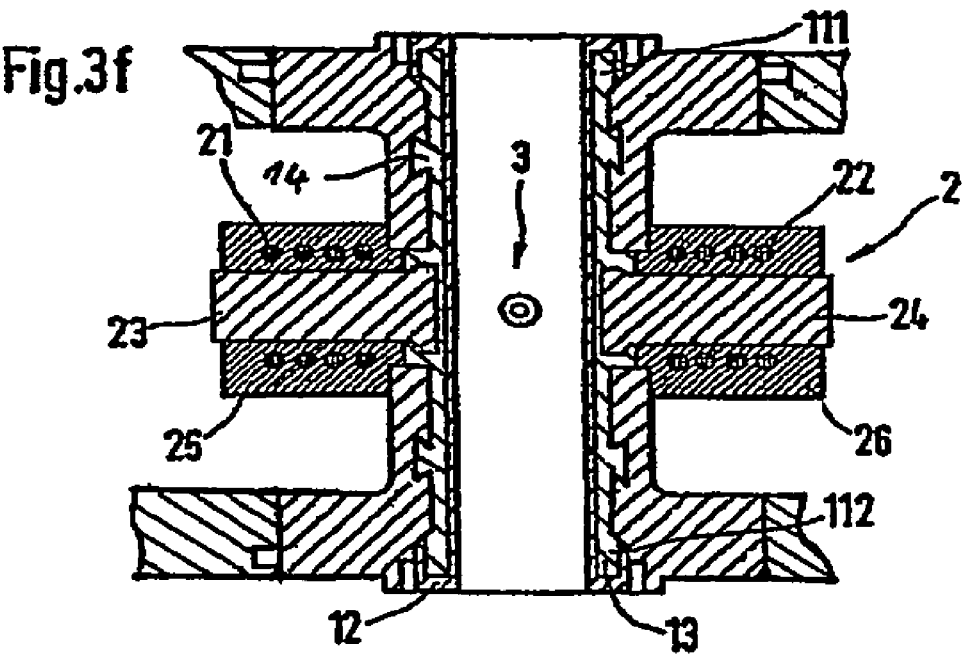
FIG. 3*f* in longitudinal section, a magneto-inductive flow sensor.

Preferably, the widenings 111, 112 of the support skeleton 13 are so filled that the liner 12 partially engages around the support skeleton 13 in the region of the widenings 111, 112 and therewith terminally practically completely covers it; compare, in this connection FIGS. 3e and 3f.

For optimum matching of pore size to the insulating material of the liner, as well as for reducing the volume shrinkage of the sintered support skeleton 13 relative to the first, respectively second, sinter volume, another embodiment of the method of the invention additionally provides corresponding sinterable mixtures of different sinter starting materials and/or of different particle sizes.

In a further development of the method of the invention, before insertion of the first sintering core 411 into the carrier tube 11, lateral openings 113, 114 are provided, and, during charging and sintering of the sinter starting material for the support skeleton 13, they are closed sinter-tightly by means of first and second sinter closures 415, 416; compare FIG. 3b. The two sinter closures 415, 416 are so embodied that the support skeleton 13 of FIG. 3c at least partially fills the two lateral surface openings 113, 114. The filling of the lateral openings 113, 114 occurs e.g. such that the support skeleton 13 lies laterally against the openings 113, 114 and so is additionally locked in place. In case required, the two openings 113, 114 are sealed casting-tightly during the filling and solidifying of the liquified insulating material for the liner 12. This is accomplished e.g. by means of first and second casting seals 515, 516, as shown in FIG. 3e. For the further stabilizing of the liner 12, additional ridges and ledges can, for example, be formed in the lateral openings 113, 114 during their manufacture, on which the support skeleton 113, respectively liner 12, can find additional support.

For the subsequent insertion of the rod-shaped measuring electrodes 31, 32 into the measuring tube 1, a further development of the method of the invention provides that also the lateral openings 115, 116 are sinter-tightly sealed by means of third, respectively fourth sintering cores (not shown), following insertion of the first sintering core 411. The sealing of the lateral openings 115, 116 occurs preferably in such a manner that the third and fourth cores reach to abut against the sintering core 411, whereby, following the sintering of the support skeleton 13, the two lateral openings 115, 116 extend right through the support skeleton 13; compare FIG. 2. In such case, the third and fourth cores have, in each case, a smallest diameter, which is at least somewhat greater than a greatest diameter of the first, respectively second, measuring electrode shaft.

In the application of galvanic measuring electrodes, according to FIG. 2, the lateral openings 115, 116 and their continuations in the support skeleton are additionally preferably casting-tightly sealed by a third, respectively fourth casting seal, in such a manner that, following solidification of the insulating material, the measuring tube 1 has, starting from the respective lateral opening 115, 116, a first, respectively second, measuring electrode feedthrough. The casting-tight sealing of the lateral openings 115, 116 can occur, for example, in such a manner that the measuring electrode feedthroughs are coated completely on their insides with a predeterminable minimum thickness of insulating material and, thus, already during manufacture of the liner 12, electrically insulated measuring electrode feedthroughs are created for the measuring electrodes to be subsequently inserted. The third, respectively fourth, casting seal is, in such case, to be formed in suitable manner, taking into consideration the casting volume shrinkage, such that, following the solidification of the insulating material, already fitting measuring electrode feedthroughs corresponding to the measuring electrode shafts 312, 322 are formed in the measuring tube 1.

In the application of capacitive measuring electrodes, the casting seals are formed, in especially advantageous manner, such that the measuring electrodes 31, 32 can be set into these in such a manner that, following the casting and solidification of the insulating material, the measuring electrodes are already arranged in their ultimate, installed position in the measuring tube 1 and are, in such case, completely electrically insulated with respect to the support skeleton 13 and the carrier tube 11, as well as relative to the fluid during operation. The measuring electrode shafts 312, 322 are preferably embodied at least sectionally prismatically, especially squarely, within the measuring electrode feedthroughs, whereby the measuring electrodes 31, 32 are easily mountable in the lumen of the measuring tube 1 without a counter-tool.

In the case of more than two measuring electrodes, the sinter-tight, respectively casting-tight sealing of the corresponding measuring electrode openings occurs before the sintering of the support skeleton, respectively before the charging of the insulating material, in analogous manner with corresponding casting, respectively sinter, seals.

Since, both in the case of the in-situ sintering as well as also in the case of the charging of the insulating material into the carrier tube 11, respectively support skeleton 13, thermal treatments are involved for achieving recrystallization processes in the structure always of exactly only one of the named components of the measuring tube, namely carrier tube 11, support skeleton 13 or liner 12, it is necessary, due to the processing sequence, that the strength-loss temperature of the carrier tube be greater than that of the support skeleton 13 and that of the latter must, in turn, be greater than the melting temperature of the liner 12.

The invention claimed is:

1. A magneto-inductive flow sensor for a fluid flowing in a pipeline, comprising:
    a measuring tube for conveying the fluid;
    a magnetic circuit arrangement arranged at said measuring tube for producing and guiding a magnetic field, which induces an electric field in the flowing fluid; and
    measuring electrodes for tapping a voltage from the electric field, wherein:
    said measuring tube includes a carrier tube and a liner, especially a tubular liner, of insulating material accommodated in a lumen of said carrier tube;
    at least one groove formed in a wall of said carrier tube, which is open toward the lumen of said carrier tube,
    said measuring tube includes, an open-pored support skeleton embedded in said liner for stabilizing said liner;
    said at least one groove, is at least partially so filled by a material, especially a sintered material, of said support skeleton, directly sintered in said carrier tube, that said support skeleton is connected by shape interlocking with said carrier tube;
    the strength loss temperature of said carrier tube is greater than the strength loss temperature of said support skeleton
    a ridge is formed on said support skeleton corresponding to said at least one groove, and said ridge is comprised, at least in part, of the material of said support skeleton and extends into said at least one groove; and
    said at least one groove is embodied as an annular groove extending essentially coaxially with the wall of said carrier tube, said at least one groove located between the first end of the measuring tube and the second end of the measuring tube and spaced apart from a first widening and spaced apart from a second widening.

2. The magneto-inductive flow sensor as claimed in claim 1, wherein:
    said at least one groove has a backcut, which is so filled by material of said support skeleton that a radially effective shape interlocking is formed between said support skeleton and said carrier tube.

3. The magneto-inductive flow sensor as claimed in claim 1, wherein:
    said carrier tube further has an additional groove, spaced from said at least one groove, formed in a wall of said carrier tube and open towards the lumen of said carrier tube.

4. The magneto-inductive flow sensor as claimed in claim 1, wherein:
    said at least one groove, is at least partially so filled by insulating material of said liner, that said liner is connected with said carrier tube by shape-interlocking.

5. The magneto-inductive flow sensor as claimed in claim 1, wherein:
    said at least one groove includes a backcut, which is so filled by insulating material of said liner, that a shape-interlocking effective at least radially inwardly is formed between said liner and said carrier tube.

6. The magneto-inductive flow sensor as claimed in claim 1, wherein:
    said at least one groove has an essentially trapezoidally shaped cross section.

7. A method for manufacturing a measuring tube for a flow sensor comprising a measuring tube which includes a carrier tube and a liner, a magnetic circuit arrangement, and measuring electrodes, which method comprises the steps of:
    forming at least one groove in a wall of said carrier tube which is open toward the lumen of said carrier tube;
    producing a support skeleton in the lumen of the carrier tube;
    forming a ridge on said support skeleton corresponding to said at least one groove, the ridge being comprised, at least in part, of the material of the support skeleton and extends into said at least one groove; and
    embodying said at least one groove as an annular groove extending essentially coaxially with the wall of said carrier tube, said at least one groove located between the first end of the measuring tube and the second end of the measuring tube and spaced apart from a first widening and spaced apart from a second widening,
    introducing the liner into the lumen of the carrier tube, wherein:
    for producing the support skeleton, loose sinter starting material is so charged into the lumen of the carrier tube, that it at least partially fills the at least one groove, and the charged sinter starting material is sintered within the carrier tube;
    for introducing the liner into the lumen, insulating material is allowed to penetrate at least partially into the produced support skeleton and is allowed to solidify in the lumen of the carrier tube, after the sinter starting material has been sintered within the carrier tube; and
    the strength loss temperature of the carrier tube is provided to be greater than the strength loss temperature of the support skeleton.

* * * * *